United States Patent [19]
Radlmann et al.

[11] 3,882,185
[45] May 6, 1975

[54] ACID-MODIFIED POLYTEREPHTHALIC ACID ESTERS

[75] Inventors: Eduard Radlmann, Dormagen; Eugen Velker, Dormagen-Hackenbroich; Francis Bentz, Cologne; Günther Nischk, Dormagen, all of Germany

[73] Assignee: Bayer Aktiengesellschaft, Leverkusen-Bayerwerk, Germany

[22] Filed: May 18, 1973

[21] Appl. No.: 361,466

[30] Foreign Application Priority Data
May 18, 1972 Germany............................ 2225255

[52] U.S. Cl.............................. 260/75 S; 8/DIG. 4
[51] Int. Cl............................................... C08g 17/08
[58] Field of Search.................................... 260/75 S

[56] References Cited
UNITED STATES PATENTS

| | | | |
|---|---|---|---|
| 3,018,272 | 1/1962 | Griffing et al. | 260/75 |
| 3,033,824 | 5/1962 | Huffman | 260/75 |

FOREIGN PATENTS OR APPLICATIONS
43-26000  11/1968  Japan

*Primary Examiner*—Melvin Goldstein
*Attorney, Agent, or Firm*—Plumley & Tyner

[57] ABSTRACT

Acid-modified terephthalic acid polyesters containing structural elements of 2-sulfonatomethyl-propanediol-(1,3). The polyesters are easily dyeable with basic dyestuffs and can be spun from the melt into filaments.

4 Claims, No Drawings

ACID-MODIFIED POLYTEREPHTHALIC ACID ESTERS

This invention relates to polyterephthalic acid esters which are modified with sulfonate groups and can be dyed with basic dyes. They are prepared by the solvent-free condensation of terephthalic acid or its derivatives with a glycol and a salt of 2-sulfonatomethyl-propanediol-(1,3) or its derivatives.

It is known that sulfonate groups can be built into polyethylene terephthalate by co-condensation, for example of sodium 3,5-di-(carbomethoxy)-benzene sulfonate or sodium 1-[3',5'-di-(carbomethoxy)-phenoxy]-propane sulfonate-(3) with dimethyl terephthalate and ethylene glycol. One of the disadvantages of these comonomers which contain sulfonate groups is that they are difficult to produce commercially because in the first cse isophthalic acid must be sulfonated with fuming sulfuric acid at temperatures above 200°C and in the second case 5-hydroxyisophthalic acid, which is difficult to prepare, must be reacted with propane sultone which is a physiologically dangerous substance. Moreover, both of these sulfonates have molecular weights in the region of 300, so that for dyeing with basic dyes it is necessary to co-condense relatively large quantities, with the result that the textile properties of threads produced from such co-condensates may be considerably impaired.

It is an object of this invention to provide high molecular weight sulfonate groups containing terephthalic acid copolyesters which are well available.

It is another object of this invention to provide high molecular weight sulfonate groups containing terephthalic acid copolyesters that are easily dyeable with basic dyes and have at the same time advantageous physical properties which make them capable of being spun into fibers. Further objects will be evident from the following description and from the example.

These objects are accomplished by a high molecular weight linear terephthalic acid copolyester which contains sulfonate groups, consisting essentially of recurrent structural elements of the general formula

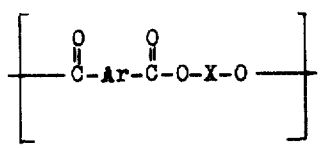

in which
Ar represents a phenylene group and
X consists of 99–70 mols-% of a straight or branched chain alkylene group containing from 2 – 20 carbon atoms, a cycloalkylene group or a group of the general formula

in which R represents a straight or branched chain alkylene group containing from 1 – 10 carbon atoms, and 1 – 30 mols-% of a group which contains sulfonate groups, represented by the general formula

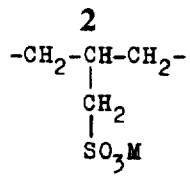

wherein M represents a metal.

These terephthalic acid copolyesters have relative solution viscosities $\eta_{rel}$ in the region of 1.1 – 4.0 (determined on a solution of 1 g of substance in 100 ml of m-cresol at 25°C).

The preferred representatives of this class of compounds consist of 99 – 70 mols-% of recurrent structural elements of the formula

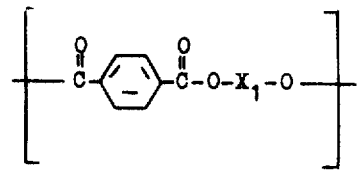

wherein $X_1$ represents the group —$CH_2$—$CH_2$— and/or the group

and from 1 – 30 mols-% of structural elements of the general formula

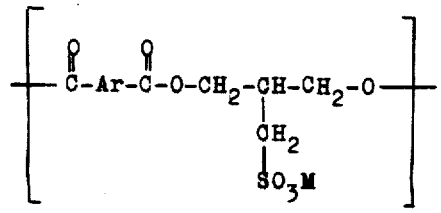

in which Ar and M have the meanings specified above. The preferred metals are alkali metals.

To prepare such polyterephthalates which are modified with sulfonate groups, dicarboxylic acid derivatives of the general formula

in which
Ar represents a phenylene group and
$R_1$ represents a hydrogen or a straight or branched chain alkyl group containing from 1 – 10 carbon atoms are polycondensed with a diol derivative of the general formula $$R_2-O-X-O-R_2$$

in which
X represents a straight or branched chain alkylene group containing from 2 – 20 carbon atoms, a cycloalkylene group or a group of the general formula

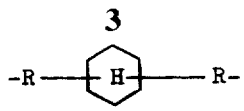

in which R represents a straight or branched chain alkylene group containing 1 – 10 carbon atoms and R₂ represents hydrogen or an aliphatic or aromatic acyl group
and a diol derivative of the general formula

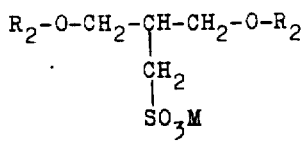

in which
M denotes a metal and
R₂ has the meaning indicated above,
the polycondensation reaction being carried out in the absence of solvent at temperatures of 150° – 300°C with the exclusion of moisture and oxygen in an inert gas atmosphere at pressures between normal pressure and 0.001 mm Hg with the aid of known catalysts, the reactants being used in such proportions that the quantity of the salt of 2-sulfonatomethyl-propanediol-(1,3) condensed into the reaction product is between 1 and 30 mols-%, based on the quantity of condensed glycols.

The reaction is preferably carried out using a dicarboxylic acid derivative of the general formula

in which
R₁ represents hydrogen or a straight or branched chain alkyl group containing from 1 – 10 carbon atoms
and a mixture of 99 – 70 mols-% of a diol

HO—CH₂—CH₂—OH and/or

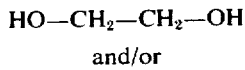

and 1 – 30 mols-% of a sulfonate-containing diol derivative of the general formula

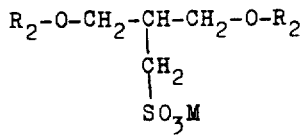

in which R₂ and M have the meanings indicated above.

Modified polyterephthalates obtained in this way can easily be processed from the solvent-free melt to produce shaped products, especially filaments and foils.

The salts of 2-sulfonatomethyl-propanediol-(1,3) or derivatives thereof used for modifying the new polyesters are prepared by an addition reaction in which bisulfites are added to 2-methylene-propanediol-(1,3) or its acyl derivatives, the reaction preferably being carried out in aqueous solution with the aid of a catalyst such as oxygen at a pH range of 3 – 9 which is kept constant by the addition of an acid and within a temperature range of −10° to 100°C. 2-Methylene-propanediol-(1,3) is preferably introduced portionswise into the bisulfite solution and the molar ratio of bisulfite to diol may lie within the range of 1:1 to 5:1.

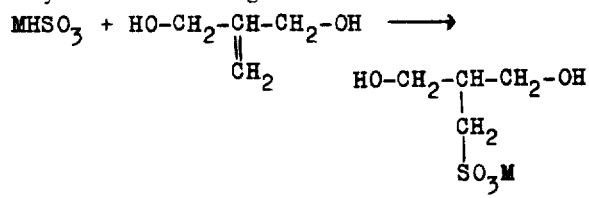

The dicarboxylic acid or its derivatives used for the polycondensation may be either free terephthalic acid or its esters (i.e. Ar in the above formulas is p-phenylene), e.g. dimethyl terephthalate or bis-β-hydroxyethyl terephthalate and limited amounts of isophthalic acid (i.e. Ar in the above formulas is m-phenylene) which should if possible not exceed 10 mols-%, or its esters.

The diols used are mainly alkylene glycols which contain from 2 – 20 carbon atoms, quinitol or glycols of the general structure

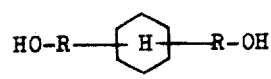

in which R has the meaning indicated above. Ethylene glycol and bis-1,4-hydroxy-methyl cyclohexane are particularly preferred.

The catalysts used for preparing the polyterephthalates are conventional ester interchange or condensation catalysts, e.g. alkali metals and alkaline earth metals, zinc, cadmium, manganese, iron, nickel, cobalt, tin, lanthanum, lead, bismuth or combinations of such metals, salts such as calcium, manganese cobalt or zinc acetate, lithium hydride, sodium alcoholates, zinc succinate or zinc acetyl acetonate, oxides such as lead oxide (PbO), antimony oxide (Sb₂O₃), germanium dioxide (GeO₂) and combinations such as antimony trioxide/manganese acetate or antimony trioxide/titanium dioxide. The quantity of catalyst added is between 0.002 and 0.2 % by weight, based on the quantity of monomers.

In a preferred embodiment of the process according to the invention, polycondensation is carried out by heating the reaction mixture, for example a mixture of a dialkyl terephthalate such as dimethyl terephthalate, ethylene glycol, a salt of 2-sulfonatomethyl-propanediol-(1,3) and a catalyst or catalyst mixture, which reaction mixture contains an excess of ethylene glycol for the ester interchange reaction, to 130° – 200°C for 1 – 4 hours with stirring in the presence of an inert gas such as nitrogen, hydrogen or helium and then to 225° – 280°C for 1 – 3 hours. The pressure is then reduced, generally to below 15 mm Hg and preferably below 1 mm Hg while the temperature is kept within the range of 250° – 290°C. Condensation is carried out under these conditions for 1 – 18 hours until the melt has the required viscosity. When the reaction has been terminated, the resulting polyester can immediately be processed from the solvent-free melt to produce articles such as threads, foils or other shaped products.

Additives such as pigments, matting agents, colour stabilisers or optical brighteners may be added to the copolyester melts without any deleterious effect on their properties.

The new products are distinguished by their excellent natural colour, good affinity for basic dyes and good mechanical and thermal properties as well as the ease with which they can be processed.

The relative solution viscosities $\eta_{rel}$ given in the following example which is to further illustrate the invention without limiting it were measured at 25°C on solutions of 1 g of substance in 100 ml of m-cresol.

EXAMPLE 194.0 parts by weight of dimethyl terephthalate, 186.0 parts by weight of ethylene glycol and 7.7 parts by weight of sodium 2-sulfonatomethyl-propanediol-(1,3) mixed with 0.5 parts by weight of zinc acetate and 0.6 parts by weight of antimony trioxide were introduced into a reaction vessel equipped with anchor agitator, gas inlet tube, distillation attachment, condenser, vacuum converter and receiver. The reaction mixture was heated to 165°C under a stream of nitrogen and the ester interchange reaction was continued for 2 hours. The temperature was then reduced to 280°C in the course of 2 hours. After disconnection of the nitrogen supply, the pressure was slowly reduced to 0.03 mm Hg over a period of 1 hour. The rate of stirring was then reduced from about 150 revs per min to about 20 revs per min, owing to the constant increase in the viscosity of the melt. Polycondensation was terminated after a further 3.5 hours. The colourless, homogeneous, highly viscous melt was worked up into shaped products and in particular into filaments. The stretched filaments were dyed dark blue with a basic dye. The colour is wash-fast.

The polyester had a softening point of 252° – 264°C and a relative solution viscosity of $\eta_{rel} = 1.98$.

PREPARATION OF SODIUM 2-SULFONATO-PROPANEDIOL-(1,3)

390 parts by weight of a commercial 40 % sodium bisulphite solution were adjusted to pH 7.05 with concentrated NaOH solution. Air was injected and the reaction solution was stirred so vigorously that it assumes a milky cloudy appearance due to the finely divided air bubbles. 88 parts by weight of 2-methylene-propanediol-(1,3) in 38 ml of water were then introduced dropwise at room temperature over a period of ¾ – 1 hour and at the same time the pH is maintained between 7.0 and 7.1 by dropwise addition of dilute sulfuric acid. The reaction was left to continue until no further change in pH was recorded. The reaction mixture was then acidified to approximately pH 3 with dilute sulfuric acid and the excess sulfur dioxide was driven out by stirring. After neutralisation with sodium hydroxide, the reaction mixture was concentrated to about half its volume by evaporation and then left to stand in a refrigerator for several hours. The Glauber salt which precipitates was then removed by filtration. The filtrate was evaporated to dryness and the residue was boiled with 90% methanol. This was then filtered and the filtrate was concentrated by evaporation and the residue recrystallised from alcohol. Yield: 142 parts by weight.

What we claim is:

1. A high molecular weight linear terephthalic acid copolyester which contains sulfonate groups, which copolyester consists essentially of recurrent structural elements of the general formula

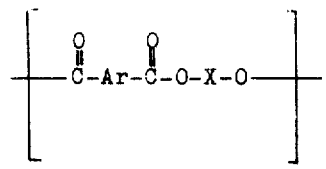

in which

Ar represents p-phenylene or p-phenylene with up to 10 mol % m-phenylene,

X consists of 99 – 70 mols-% of a straight or branched chain $C_2$ to $C_{20}$ alkylene group, a cycloalkylene group or a group of the general formula

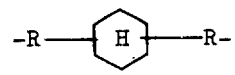

in which R represents a straight or branched chain $C_1$ to $C_{10}$ alkylene group and 1 – 30 mols-% of a group which contains sulfonate groups, represented by the general formula

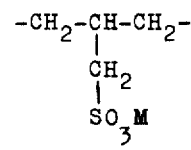

in which M represents a metal.

2. The copolyester of claim 1 which consists of from 99 – 70 mols-% of recurrent structural elements of the formula

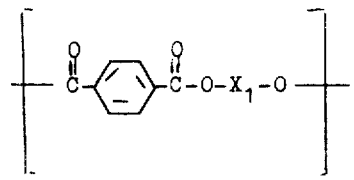

in which $X_1$ represents the group —$CH_2$—$CH_2$—, the group

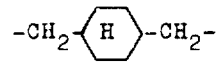

or mixtures of said groups
and from 1 – 30 mols-% of structural elements of the general formula

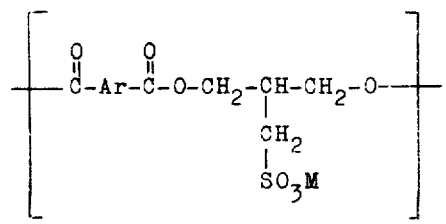

in which Ar and M have the meanings specified in claim 1.

3. The copolyester of claim 1 in which, in the general formula of claim 1, M represents an alkali metal.

4. A filament produced from the solvent-free melt of a copolyester according to claim 1.

* * * * *